Dec. 9, 1924.

C. A. STOCK

DENTAL TOOL

Filed May 22, 1922

Inventor
Clarence A. Stock
By Arthur L. Slee
Atty.

Dec. 9, 1924.                                           1,518,825
C. A. STOCK
DENTAL TOOL
Filed May 22, 1922                     2 Sheets-Sheet 2
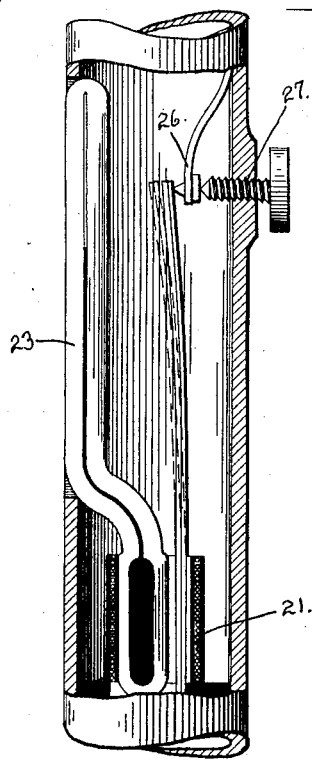
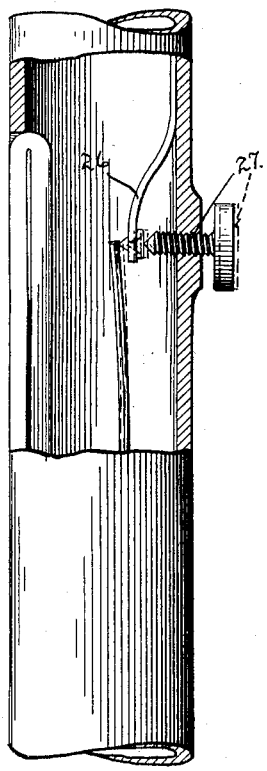
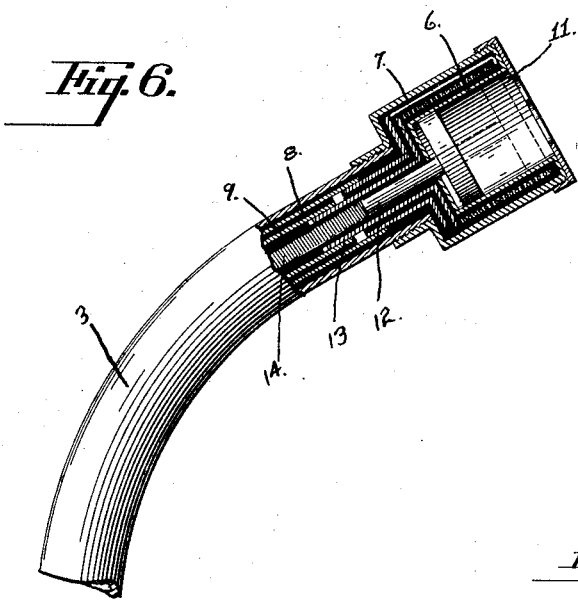
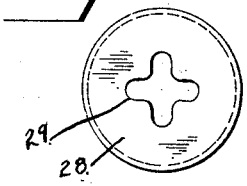
Inventor
Clarence A. Stock
By Arthur L. Slee
Atty.

Patented Dec. 9, 1924.

1,518,825

UNITED STATES PATENT OFFICE.

CLARENCE A. STOCK, OF RICHMOND, CALIFORNIA.

DENTAL TOOL.

Application filed May 22, 1922. Serial No. 562,837.

*To all whom it may concern:*

Be it known that I, CLARENCE A. STOCK, a citizen of the United States, residing in Richmond, Contra Costa County, and State of California, have invented a new and useful Improvement in a Dental Tool, of which the following is a specification.

My invention relates to improvements in a dental tool for heating wax and similar substances preparatory to making impressions of a tooth within the mouth of a patient.

The primary object of my invention is to provide an improved dental tool to facilitate the heating and placing of a substance for making an impression of a tooth.

Another object is to provide improved means for regulating the degree to which a substance is heated preparatory to making an impression thereof.

A further object is to provide means for automatically maintaining a heated substance at a desired temperature preparatory to making an impression.

A still further object is to provide means for accurately indicating the temperature to which the impression taking substance is heated.

Another object is to provide an improved tool of the character described having improved means for expelling the substance in a desired shape directly upon the surface to facilitate the making of an impression thereof.

I accomplish these and other objects by means of the improved device disclosed in the drawings forming a part of the present specification wherein like characters of reference are used to designate similar parts throughout the said specification and drawings, and in which:

Fig. 4 is an enlarged broken vertical section disclosing the heat regulating means and indicating means.

Fig. 5 is an enlarged broken section disclosing the manner in which the degree of heat to be maintained is adjusted.

Fig. 6 is an enlarged view, partly in section, of a portion of the tip.

Fig. 7 is a front elevation of a dispensing cap disclosing one form of dispensing aperture.

Figure 1:
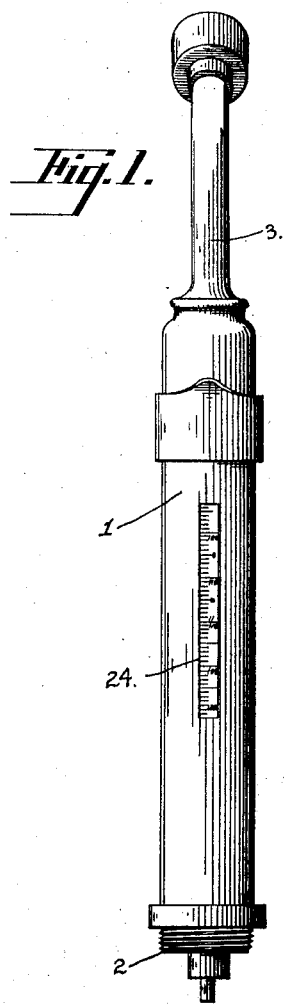
Fig. 1 is a front elevation of my improved dental tool.

Referring to the drawings the numeral 1 is used to designate in general a handle portion, one end of which is arranged as at 2 to be connected in the usual manner to a suitable electrical connection, not shown. To the other end of the handle 1 is removably secured a tip portion 4 having a chamber 6 arranged to receive a suitable quantity of wax or similar substance adapted for the making of impressions.

As is well known in the art, the wax used in making dental impressions must be heated to a temperature adapted to reduce it to a suitable plastic state before application to the tooth of a patient. An overheating of the wax detracts from its quality and is often painful to the patient, while insufficient heating makes the obtaining of a correct impression extremenly difficult, if not impossible. In order to heat such wax to the proper temperature, I have provided a coil 7 within the tip 4, said coil surrounding the chamber 6. The coil is electrically connected to suitable conductors 8 and 9 extending through the conduit 3 for electrical connection to a source of electrical energy in the manner hereinafter more fully described.

Figure 2:
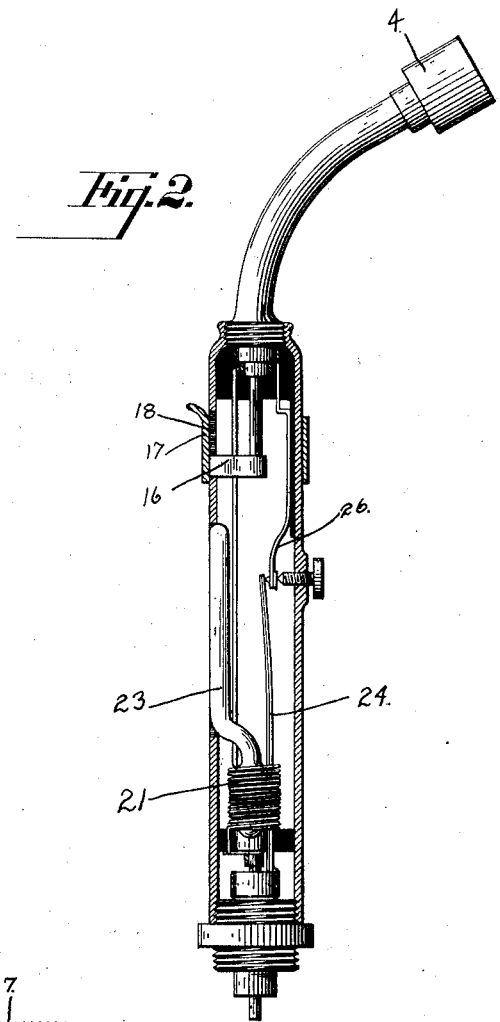
Fig. 2 is a side elevation of Fig. 1, partly in section.
Figure 3:
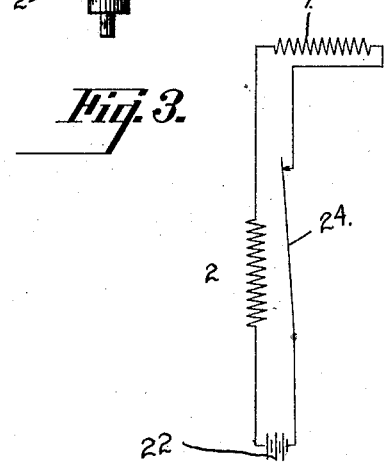
Fig. 3 is a conventional wiring diagram of the electrical connections.

A piston 11 is slidably mounted within the chamber 6 said piston being provided with a stem 12 extending into a tube 13 centrally disposed within the conduit 3. The piston is arranged to be actuated by a flexible connection 14 slidably mounted through the tube 13 said connection 14 extending through the conduit 3 into the adjacent end of the handle 1 to be engaged by an extension 16 of an actuating member 17 slidably mounted upon the handle 1, said extension 16 operating through a slot 18 as best shown in Fig. 2 of the drawings. The piston 11 and stem 12 are removable with and from the tip 3 for cleaning and sterilization.

Wax, inserted into the chamber 6, is heated to a desired temperature by means of the coil 7 which is designed to afford a resistance to the passage of electricity therethrough such as will develop the required amount of heat. When the wax is heated, the tip is inserted into the mouth of a patient and the heated wax expelled directly upon the desired surface, by advancing the actuating member 17 along the handle 1, the connection 14 and piston 11 thereby being moved forwardly in the obvious manner.

In order to insure that the wax will be heated to the correct temperature I have provided within the handle 1 a second coil 21 of a size and character similar to the coil 7 and connected therewith in such a manner as to develop a degree of heat exactly equal to the degree developed by said coil 7 when an electric current from a source of energy 22 is passed therethrough.

A thermometer 23 is mounted within the handle 1 in such manner as to be influenced by the coil 21 and readable through a window 24 within the side of the handle 1, the coils 21 and 7 being arranged to develop equal degrees of heat. The degree indicated by the thermometer 23 will thus be an indication of the heat to which the wax within the chamber 6 is heated.

To prevent the overheating of the wax I have provided that the current passing between the coils 7 and 21 and the source of energy 22 shall be automatically controlled by a thermostat 24 arranged to automatically break the circuit when the desired degree of heat has been developed. The thermostat 24 is preferably made a part of the circuit, the thermostat itself serving to conduct current into an adjustable contact point 26 to one of the battery connections, said thermostat being arranged to normally close the contact 26 and to break said contact when the heat developed by the coils 21 and 7 has reached the predetermined degree, as best shown in Fig. 4 of the drawings wherein the free end of the thermostat is shown in full lines in engagement with the contact 26, and in dotted lines in a moved position out of engagement with said contact, whereby the circuit is broken. The thermostat may be influenced either by heat imparted thereto from the coil 21 or by internal resistance to the passage of the current therethrough, but as the construction and operation of such thermostats are so well known no specific description of their construction need herein be given. The degree of heat at which the circuit is broken is governed by means of a suitable adjusting member 27, such as a thumb screw shown on the drawings, said member 27 being adapted to move the contact 26 to vary the degree at which it will be disengaged by the thermostat.

In Fig. 5 I have shown in full lines the position of the adjusting member 27 and contact 26 for one temperature and in dotted lines for a lower temperature. The operation of my device is as follows: The wax to be heated is inserted into the chamber 6 as above described and electric current from the source of energy 22 is passed through the coils 21 and 7 and thermostat 24 and their intermediate connections. As the temperature rises due to the resistance in the coils the wax within the chamber 6 will be reduced to a plastic state, the degree of heat being simultaneously indicated by the thermometer 23. When the temperature reaches the desired degree the circuit will be automatically broken by movement of the thermostat away from the contact 26 further heating of the wax being thereby prevented. After the circuit is broken the temperature will, of course, immediately start to drop, in which event the thermostat will again engage the contact 26 and again close the circuit until the temperature is again returned to the desired degree, in this manner, by alternately heating; break the circuit, maintaining the wax at the desired temperature. The tip is then inserted into the mouth of the patient and wax discharged therefrom in the manner hereinbefore explained.

A cap 28 having a dispensing aperture 29 of suitable shape is removably secured over the end of the tip 5 in such manner that the wax will be discharged through said aperture 29 in the approximate shape desired. When sufficient wax has been dispensed a lateral movement of the tip will cause the edges of the cap 28 to sever the dispensing wax from the residue remaining within the chamber 6. The tip is then removed from the mouth of the patient and the wax dispensed upon the tooth is manipulated in the usual manner for making an impression.

The conduit 3 may be made of any desired shape, in practice it being preferred to provide a plurality of conduits of equal length but of different shape to facilitate insertion of the tip to different portions of the mouth as particular circumstances may require. Similarly a plurality of caps 28 having apertures 29 of different shapes should be provided to accommodate the requirements of different characters of work.

From the above description it will be readily seen that I have provided an improved dental tool wherein an impression taking substance may be readily heated to a desired temperature and maintained at that temperature prior to use, and from which the heated wax may be readily dispensed directly upon the tooth or other surface of which an impression is to be made.

While the construction illustrated is the preferred embodiment of my invention I do not restrict myself to the precise construction therein disclosed as obviously the structure and arrangement may be modified in many ways without departing from the spirit of my invention. I, therefore, do not restrict myself to the precise construction herein described but reserve all such modifications which may fall within the scope of the appended claims.

Having thus described my invention what I claim as new and desire to secure by Letters Patent is:

1. A dental tool comprising a heating chamber adapted for insertion into the mouth of a patient and arranged to receive a quantity of a material adapted to become plastic when heated; electrical means mounted in connection with said chamber for heating said material; and means operatively connected to said chamber for forcing said material outwardly therefrom when heated.

2. A dental tool comprising a heating chamber adapted for insertion into the mouth of a patient and arranged to receive a quantity of a material adapted to become plastic when heated; electrical means mounted in connection with said chamber for heating said material; means for automatically regulating to a predetermined degree the heat applied to said material; and means operatively connected to said chamber for forcing the heated material outwardy therefrom.

3. A dental tool comprising a heating chamber adapted for insertion into the mouth of a patient and arranged to receive a quantity of a material adapted to become plastic when heated; electrical means mounted in connection with said chamber for heating said material; means for automatically regulating to a predetermined degree the heat applied to said material; means for indicating said degree of heat; and means operatively connected to said chamber for forcing said material outwardly therefrom.

4. A dental tool comprising a handle portion; a tip portion attachable to said handle portion, said tip portion including a heating chamber; heating means mounted in connection with the chamber for heating substance placed therein; and means mounted within the handle and tip for discharging said substance from the chamber when heated.

5. A dental tool comprising a handle portion; a tip portion attachable to said handle portion, said tip portion including a heating chamber; heating means mounted in connection with the chamber for heating substance placed therein; means mounted within the handle and tip for discharging said substance from the chamber when heated; and means mounted within the handle for regulating the degree to which said substance is heated.

6. A dental tool comprising a handle portion; a tip portion attachable to said handle portion, said tip portion including a heating chamber; heating means mounted in connection with the chamber for heating substance placed therein; means mounted within the handle and tip for discharging said substance from the chamber when heated; means mounted within the handle for regulating the degree to which said substance is heated; and means for indicating said degree of heat.

7. A dental tool comprising a handle portion; a tip portion attachable to said handle portion, said tip being provided with a heating chamber; a heating coil mounted within the tip for heating substance placed in said chamber; a similar coil mounted within the handle and connected with the tip coil said coils being arranged to be heated to the same degree by a common electric circuit; and a thermostat connected with said circuit for automatically regulating the degree of heat developed by said coils.

8. A dental tool comprising a handle portion; a tip portion attachable to said handle portion, said tip being provided with a heating chamber; a heating coil mounted within the tip for heating substance placed in said chamber; a similar coil mounted within the handle and connected with the tip coil said coils being arranged to be heated to the same degree by a common electric circuit; a thermostat connected with said circuit for automatically regulating the degree of heat developed by said coils; means for adjusting said thermostat to vary the degree of heat; and a thermometer mounted adjacent the handle coil and influenced by the heat thereof to indicate the degree of heat developed.

9. A dental tool comprising a handle portion; a tip portion attachable to said handle portion, said tip being provided with a heating chamber; a heating coil mounted within the tip for heating substance placed in said chamber; a similar coil mounted within the handle and connected with the tip coil said coils being arranged to be heated to the same degree by a common electric circuit; a thermostat connected with said circuit for automatically regulating the degree of heat developed by said coils; means for adjusting said thermostat to vary the degree of heat; a thermometer mounted adjacent the handle coil and influenced by the heat thereof to indicate the degree of heat developed; and means for discharging the heated substance from the chamber.

10. A dental tool comprising a handle portion; a tip portion attachable to said handle portion, said tip being provided with a heating chamber; a heating coil mounted within the tip for heating substance placed in said chamber; a similar coil mounted within the handle and connected with the tip coil said coils being arranged to be heated to the same degree by a common electric circuit; a thermostat connected with said circuit for automatically regulating the degree of heat developed by said coils; means for adjusting said thermostat to vary the degree of heat; a thermometer mounted adjacent the handle coil and influenced by the heat thereof to indicate the degree of heat developed; and a piston slidably mounted within the chamber and arranged to be advanced to discharge the substance from said chamber.

11. In a dental tool; a tip including a chamber arranged to receive a quantity of substance adapted to become plastic when heated; a heating coil mounted around said chamber; means mounted within the chamber for discharging the said substance when heated; and means for imparting a desired shape to said substance as discharged.

12. In a dental tool, a tip including a chamber arranged to receive a quantity of substance adapted to become plastic when heated; a heating coil mounted around said chamber; means mounted within the chamber for discharging said substance when heated; and a cap arranged to be mounted over the end of said chamber, said cap having an aperture of a desired shape through which the substance is discharged to impart the desired shape.

In witness whereof I hereunto set my signature.

CLARENCE A. STOCK.